United States Patent
Perlak et al.

(10) Patent No.: US 10,794,273 B2
(45) Date of Patent: Oct. 6, 2020

(54) ADVANCED DISTRIBUTED ENGINE ARCHITECTURE-DESIGN ALTERNATIVE

(71) Applicant: UNITED TECHNOLOGIES CORPORATION, Hartford, CT (US)

(72) Inventors: Jeffery F. Perlak, South Windsor, CT (US); Joseph B. Staubach, Colchester, CT (US); Gabriel L. Suciu, Glastonbury, CT (US); James D. Hill, Tolland, CT (US); Frederick M. Schwarz, Glastonbury, CT (US)

(73) Assignee: Raytheon Technologies Corporation, Farmington, CT (US)

( * ) Notice: Subject to any disclaimer, the term of this patent is extended or adjusted under 35 U.S.C. 154(b) by 1017 days.

(21) Appl. No.: 14/789,036

(22) Filed: Jul. 1, 2015

(65) Prior Publication Data

US 2017/0002735 A1      Jan. 5, 2017

(51) Int. Cl.
    *F02C 3/107*    (2006.01)
    *F02C 3/14*     (2006.01)
    *F02C 3/10*     (2006.01)

(52) U.S. Cl.
    CPC ............ *F02C 3/107* (2013.01); *F02C 3/10* (2013.01); *F02C 3/145* (2013.01); *F05D 2210/44* (2013.01); *F05D 2260/4031* (2013.01)

(58) Field of Classification Search
    CPC ........ F02C 3/10; F02C 3/107; F05D 2210/44; B64C 2700/6281
    See application file for complete search history.

(56) References Cited

U.S. PATENT DOCUMENTS

| | | | | |
|---|---|---|---|---|
| 2,504,181 A | * | 4/1950 | Constant ................. | F02K 3/065 60/226.1 |
| 2,575,683 A | * | 11/1951 | Price ....................... | F02C 3/107 123/41.19 |
| 3,678,690 A | * | 7/1972 | Shohet ..................... | F02C 3/10 244/53 R |
| 3,738,105 A | * | 6/1973 | Buchelt ................... | F23R 3/425 417/409 |

(Continued)

FOREIGN PATENT DOCUMENTS

| | | |
|---|---|---|
| GB | 2199083 | 6/1988 |
| GB | 2232720 | 12/1990 |
| WO | 2014116242 | 7/2014 |

OTHER PUBLICATIONS

Jane's Aero-Engines, Issue Seven, Edited by Bill Gunston, Jane's Information Group Inc., Alexandria, Virginia, 2000, pp. 1-8, 61.*

(Continued)

*Primary Examiner* — Ehud Gartenberg
*Assistant Examiner* — James P McGlynn
(74) *Attorney, Agent, or Firm* — Carlson, Gaskey & Olds, P.C.

(57) ABSTRACT

A gas turbine engine according to the present disclosure includes a first compressor and a first turbine for driving the first compressor. A core section includes a second compressor and a second turbine for driving the second compressor. A third turbine is arranged fluidly downstream of the first turbine and the second turbine and configured to drive a power take-off. A first duct system is arranged fluidly between the low-pressure compressor and the core section. The first duct system is arranged to reverse fluid flow before entry into the core section.

6 Claims, 2 Drawing Sheets

(56) References Cited

U.S. PATENT DOCUMENTS

| | | | |
|---|---|---|---|
| 8,096,753 | B2 | 1/2012 | Norris et al. |
| 8,176,725 | B2 | 5/2012 | Norris et al. |
| 8,516,789 | B2 | 8/2013 | Kupratis |
| 8,641,371 | B2 * | 2/2014 | Nakamura .............. F01D 11/18 415/139 |
| 8,935,912 | B2 * | 1/2015 | Norris .................... F02K 3/105 60/226.1 |
| 9,500,129 | B2 * | 11/2016 | Schmittenberg ....... B64D 33/02 |
| 2012/0111018 | A1 | 5/2012 | Norris et al. |
| 2012/0167591 | A1 | 7/2012 | Drachsler |
| 2013/0145769 | A1 | 6/2013 | Norris |
| 2013/0255224 | A1 | 10/2013 | Kupratis et al. |
| 2014/0306460 | A1 * | 10/2014 | Donnelly ................ F02C 7/268 290/1 A |

OTHER PUBLICATIONS

Saravanamuttoo, H.I.H. (1987). Modem turboprop engines. Prog. Aerospace Sci. vol. 24. pp. 225-248.

European Search Report for European Patent Application No. 1617507 completed Nov. 18, 2016.

\* cited by examiner

ADVANCED DISTRIBUTED ENGINE ARCHITECTURE-DESIGN ALTERNATIVE

STATEMENT REGARDING FEDERALLY SPONSORED RESEARCH FOR DEVELOPMENT

This invention was made with government support under Contract No. W911W6-13-2-0008, awarded by the United States Army. The government has certain rights in this invention.

BACKGROUND

This disclosure relates to gas turbine engines, and more particularly, but without limitation, to a reverse core gas turbine engine.

Gas turbine engines typically include at least one compressor section, combustor section, and turbine section. During operation, fluid is pressurized in the compressor section and mixed with fuel and burned in the combustor section to generate hot combustion gases. The hot combustion gases are communicated through the turbine section, which extracts energy from the hot combustion gases to power the compressor section and other gas turbine engine loads.

Another feature that has been incorporated into gas turbine engines is a reverse core engine. In a reverse core engine, the working fluid is redirected axially forward toward the front of the engine. Existing reverse core engines are turbofan type engines. Reverse core engines may provide some additional engine operating efficiency, but it is desirable to further improve their efficiency and to develop alternative engine types.

SUMMARY

A gas turbine engine according to the present disclosure includes a first compressor and a first turbine for driving the first compressor. A core section includes a second compressor and a second turbine for driving the second compressor. A third turbine is arranged fluidly downstream of the first turbine and the second turbine and configured to drive a power take-off. A first duct system is arranged fluidly between the low-pressure compressor and the core section. The first duct system is arranged to reverse fluid flow before entry into the core section.

In a further embodiment of any of the present disclosure the power take-off is axially aft of the first compressor. The third turbine is axially aft of the power take-off. The first turbine is axially aft of the third turbine. The second turbine is axially aft of the first turbine, and the second compressor is axially aft of the second turbine. The second compressor is arranged fluidly after the first compressor. The combustor is arranged fluidly after the second compressor. The second turbine is arranged fluidly after the combustor. The first turbine is arranged fluidly after the second turbine, and the third turbine is arranged fluidly after the first turbine.

In a further embodiment of any of the present disclosure the first compressor is configured to receive fluid flowing in an axially aft direction. The second compressor, the first turbine, the second turbine, and the third turbine are configured to receive fluid flowing in an axially forward direction opposite the axially aft direction.

In a further embodiment of any of the present disclosure, the first turbine is arranged fluidly between the second turbine and the third turbine.

A further embodiment of any of the foregoing embodiments includes a centrifugal compressor arranged fluidly between the second compressor and the combustor, wherein the combustor is a reverse flow combustor.

In a further embodiment of any of the present disclosure, the core section is disposed at an axial end of the engine.

In a further embodiment of any of the present disclosure, the first duct system is configured to reverse fluid flow 180 degrees.

In a further embodiment of any of the present disclosure the second turbine is rotatable about an axis. The third turbine is rotatable around the axis.

In a further embodiment of any of the present disclosure, the power take-off is disposed axially between the first compressor and the power turbine.

In a further embodiment of any of the present disclosure, the engine is a turboshaft engine.

In a further embodiment of any of the present disclosure, the first compressor and the first turbine rotate as a first spool. The second compressor and the second turbine rotate as a second spool. The first spool is different from the second spool.

In a further embodiment of any of the present disclosure, the first spool and the second spool are rotatable about an axis.

A further embodiment of any of the foregoing embodiments includes an inlet particle separator arranged fluidly before the first compressor.

In a further embodiment of any of the present disclosure, the core section is mechanically decoupled from the rest of the engine.

In a further embodiment of any of the present disclosure the first turbine, the second turbine, and the third turbine are arranged to receive working fluid flowing in a forward direction.

In a further embodiment of any of the present disclosure, the power take-off is configured to power a helicopter rotor system.

In a further embodiment of any of the present disclosure, an overall pressure ratio of the first compressor and the second compressor is between 32:1 and 60:1.

In a further embodiment of any of the present disclosure, the low pressure compressor is configured to receive working fluid flowing in an aft direction. The high pressure compressor is configured to receive the working fluid flowing in a forward direction opposite the aft direction.

A further embodiment of any of the foregoing embodiments includes a second duct system arranged fluidly after the power turbine and is configured to reverse fluid flow and direct the fluid out of the engine.

In a further embodiment of any of the present disclosure, the low pressure compressor is configured to receive a working fluid flowing in an aft direction. The low pressure turbine is configured to receive the working fluid flowing in a forward direction opposite the aft direction.

DETAILED DESCRIPTION

Figure 1:
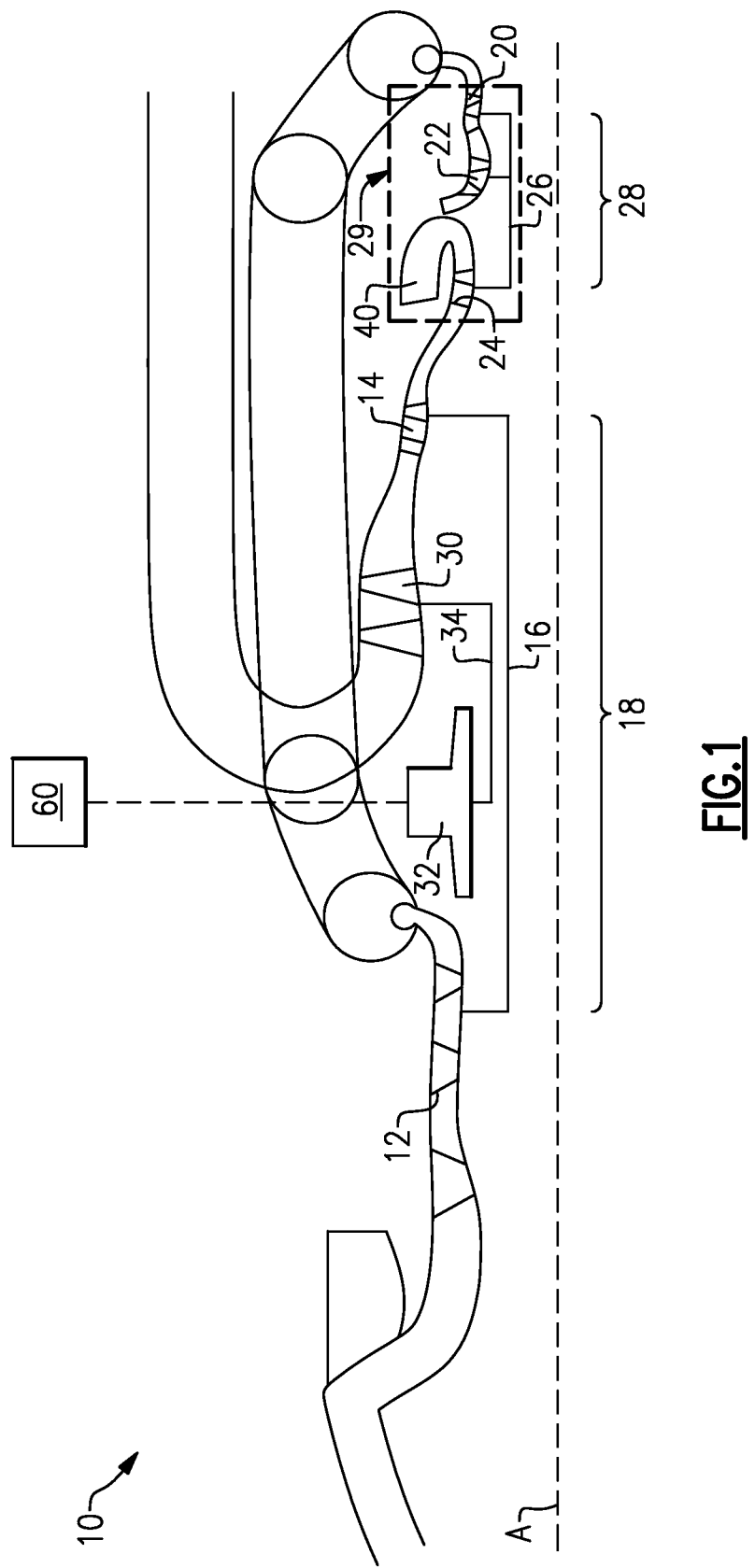
FIG. 1 schematically shows an example reverse core engine.

FIG. 1 schematically shows an example reverse core gas turbine engine 10. The engine 10 includes a low pressure compressor 12 and a low pressure turbine 14 for driving the low pressure compressor 12 through a shaft 16. The low pressure compressor 12, the low pressure turbine 14, and the shaft 16 form a low pressure spool 18.

The engine 10 further includes a high pressure compressor 20, a centrifugal compressor 22, and a high pressure turbine 24 for driving the high pressure compressor 20 and the centrifugal compressor 22 through a shaft 26. The high pressure compressor 20, the centrifugal compressor 22, the high pressure turbine 24, and the shaft 26 form a high pressure spool 28. A combustor 40 is arranged fluidly between the centrifugal compressor 22 and the high pressure turbine 24. The high pressure spool 28 and the combustor 40 form the core section 29 of the engine 10. The core section 29 is mechanically decoupled and separate from the rest of the engine 10.

The engine 10 further includes a power turbine 30 for driving a power take-off 32 through a shaft 34. In the example, the power take-off 32 is located axially between the low pressure compressor 12 and the power turbine 30, with respect to the axis A.

The shaft 16, the shaft 26, and the shaft 34 all rotate about the same centerline axis A. However, since the core section 29 is mechanically decoupled from the rest of the engine 10, the core section 29 could be offset from the shafts 16 and 34 if necessary to accommodate installation requirements.

In an axial direction along axis A, where moving left to right in FIG. 1 is moving forward to aft, the example engine 10 is arranged as follows: the power take-off 32 is arranged axially aft of the low-pressure compressor 12; the power turbine 30 is arranged axially aft of the power take-off 32; the low pressure turbine 14 is arranged axially aft of the power turbine 30; the high pressure turbine 24 is arranged axially aft of the low pressure turbine 14; the centrifugal compressor 22 is arranged axially aft of the high pressure turbine 24; the high pressure compressor 20 is arranged axially aft of the high pressure turbine 24.

Figure 2:
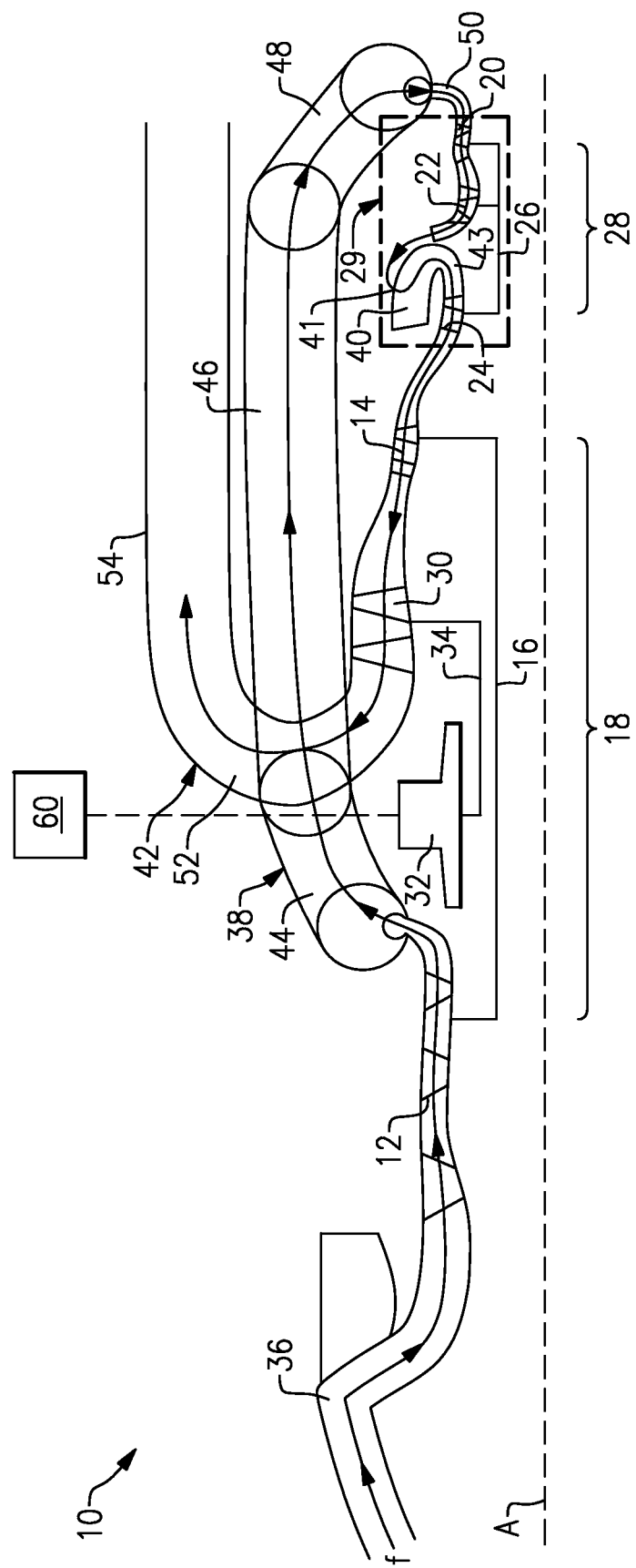
FIG. 2 schematically shows the working fluid flow path through the example reverse core engine.

FIG. 2 schematically shows a flow path f of working fluid through the example engine 10. The working fluid enters the engine and flows through an inlet particle separator 36 and is then compressed while flowing aft through the low pressure compressor 12. After exiting the low pressure compressor 12, the working fluid enters and flows aft through a first duct system 38, arranged fluidly between the low pressure compressor 12 and the high pressure compressor 20. The first duct system 38 reverses the path of the working fluid before it enters the core section 29.

In core section 29, the working fluid flows axially forward through the high pressure compressor 20 and then radially outward through the centrifugal compressor 22. The centrifugal compressor 22 differs from an axial compressor in that flow through a centrifugal compressor includes a radial component.

In the example, the combustor 40 is a reverse flow combustor, such that the centrifugal compressor 22 orients the working fluid in the proper direction for flowing across the combustor 40. The working fluid flows axially aft and radially inward initially across the combustor 40, turning approximately 90 degrees, and then turns approximately 90 more degrees, such that its flow is axially forward into the inlet of the high pressure turbine 24. The reverse flow combustor 40 includes an inlet 41 and an outlet 43 fluidly downstream of and radially inward and axially aft of the inlet 41. Thus, after the working fluid is mixed with fuel and ignited by the combustor 40, it flows axially forward through the high pressure turbine 24, which powers the high pressure compressor 20 and the centrifugal compressor 22. Although a reverse flow combustor is disclosed as the example combustor 40, one of ordinary skill in the art, having the benefit of this disclosure, would realize that a conventional combustor may be used.

The working fluid then exits the core section 29, after flowing through the high pressure turbine 24, and flows axially forward through the low pressure turbine 14, which powers the low pressure compressor 12. After the working fluid flows through the low pressure turbine 14, it flows axially forward through the power turbine 30 which powers the power take-off 32. Thus, the low pressure turbine 14 is arranged fluidly between the high pressure turbine 24 and the power turbine 30. The working fluid flows axially forward through the high pressure turbine 24, the low pressure turbine 14, and the power turbine 30. After the working fluid flows through the power turbine 30, it flows into a second duct system 42 which reverses the flow about 180° to flow axially aft and out of the engine.

The working fluid flows through the high pressure compressor 20 at a direction that is 180° different from the direction that the working fluid flows through the low pressure compressor 12, due to orientation of the first duct system 38. As fluid flows through the first duct system 38, it flows through a first section 44, then through a second section 46, then through a third section 48, and lastly through a connector section 50. The first section 44 directs the working fluid both radially outward and axially aft; the second section 46 directs the working fluid axially aft; the third section 48 directs the working fluid radially inward and axially aft; the connector section 50 connects the third section 48 to the high pressure compressor 20 and directs the working fluid radially inward and axially forward, such that the working fluid is directed through the high pressure compressor 20 in a direction 180° from the direction that it flows through the low pressure compressor 12. Although an example configuration for duct system 38 is disclosed, one of ordinary skill, having the benefit of this disclosure, would recognize that alternative configurations could be used.

In the example, the low pressure compressor 12, the high pressure compressor 20, the centrifugal compressor 22, the combustor 40, the high pressure turbine 24, the low pressure turbine 14, and the power turbine 30 are all disposed radially inward of the second section 46 of the first duct system 38. The combustor 40, the high pressure turbine 24, the low pressure turbine 14, and the power turbine 30 are axially within the second section 46 of the first duct system 38.

The second duct system 42 includes a first section 52 for directing the working fluid substantially radially outward and a second section 54 for directing the working fluid axially aft and out of the engine. The second section 54 of the second duct system 42 is disposed radially outward of the first duct system 38 and runs substantially parallel to the second section 46 of the first duct system 38.

The core section 29 is mechanically decoupled from the rest of the engine. In a conventional straight flow engine configuration, the modules are arranged axially from forward to aft: low pressure compressor, high pressure compressor, combustor, high pressure turbine, low pressure turbine, and power turbine. In this arrangement, the low pressure shaft has to fit concentrically and radially inward of the high pressure shaft. Because the high pressure shaft spins at a significantly higher rate than the low pressure shaft, the diameter of the high pressure shaft is limited due to the speed and diameter limits of its support bearings. It follows that the diameter of the low pressure shaft is also limited. The permissible axial spacing of the low shaft bearings and the diameter limitations of the low shaft lead to the low shaft being challenged by vibration and rotating deflection limits. Furthermore, if the power turbine shaft is brought forward through the low shaft, these design limitations are intensified. With the reverse flow configuration of engine 10, these design limitations are eliminated. The low pressure shaft 16 and high pressure shaft 26 are not nested. Thus, the core section 29 is mechanically decoupled.

The architecture of the example reverse core engine 10 allows for high overall pressure ratio (OPR) to be achieved. The example engine 10 utilizes three compressor sections (low pressure compressor 12, high pressure compressor 20, and centrifugal compressor 22) to increase the working fluid to a high pressure. The OPR is the total compression through all compression sections. Without the need to nest the low pressure shaft 16 and high pressure shaft 26, which affects performance as described above, the design limitations on the shafts are eliminated, allowing for higher OPR to be achieved.

The location of the core section 29 allows for easy serviceability. As is shown, the core section 29 is located at the axially aft end of the engine and is remote and mechanically decoupled from the rest of the engine. The core section is the section of the engine subject to the highest temperatures. Thus, it is also the section subject to the most deterioration and life issues. By locating the core section 29 at the axially aft end of the engine, the components comprising core section 29 are more easily accessible for servicing. That is, the core section 29 can be removed and reattached for servicing more easily when located at the axial end of the engine than it would be when located at the axial center of the engine, where servicing the core would require complete disassembly of the engine.

The example engine 10 is a turboshaft engine type used to power a helicopter. The power take-off 32 is thus a gearbox utilized to drive a helicopter rotor system 60 (shown schematically). However, one of ordinary skill in the art, having the benefit of this disclosure, would recognize that the power take-off could be used to transfer power to other applications. The disclosure is thus not limited to turboshaft type engines, and the power take-off is not limited to powering a helicopter rotor system. The example engine 10 is a 3,000 shaft horsepower engine, but other engine sizes are contemplated.

The preceding description is exemplary rather than limiting in nature. Variations and modifications to the disclosed examples may become apparent to those skilled in the art that do not necessarily depart from the essence of this disclosure. Thus, the scope of legal protection can only be determined by studying the following claims.

We claim:

1. A gas turbine engine, comprising:
   a first compressor and a first turbine for driving the first compressor;
   a core section including a second compressor and a second turbine for driving the second compressor;
   a third turbine arranged fluidly downstream of the first turbine and the second turbine and configured to drive a power take-off; and
   a first duct system arranged fluidly between the first compressor and the core section, the first duct system arranged to reverse fluid flow before entry into the core section, wherein the first compressor is configured to receive a working fluid flowing in an axially aft direction, the second compressor is configured to receive the working fluid flowing in an axially forward direction opposite the axially aft direction, and the first compressor is directly joined to the first duct system;
   a combustor; and
   a centrifugal compressor arranged fluidly between the second compressor and the combustor, wherein the combustor is a reverse flow combustor.

2. The gas turbine engine as recited in claim 1, wherein the engine is a turboshaft engine.

3. The gas turbine engine as recited in claim 2, comprising:
   an inlet particle separator arranged fluidly before the first compressor.

4. The gas turbine engine as recited in claim 2, wherein the power take-off is configured to power a helicopter rotor system.

5. The gas turbine engine as recited in claim 2, wherein the first duct system comprises a first section configured to direct working fluid radially outward and axially aft, a second section configured to direct working fluid axially aft, a third section configured to direct working fluid radially inward and axially aft, and a connector section configured to direct working fluid radially inward and axially forward.

6. The gas turbine engine as recited in claim 5, wherein the first compressor is radially inward of the second section of the first duct system.

* * * * *